United States Patent [19]

Takaku

[11] Patent Number: 5,617,722
[45] Date of Patent: Apr. 8, 1997

[54] EXHAUST CONTROL DEVICE OF INTERNAL COMBUSTION ENGINE

[75] Inventor: Yutaka Takaku, Mito, Japan

[73] Assignee: Hitachi, Ltd., Japan

[21] Appl. No.: 578,435

[22] Filed: Dec. 26, 1995

[30] Foreign Application Priority Data

Dec. 26, 1994 [JP] Japan .................................. 6-322428

[51] Int. Cl.[6] ........................................... F01N 3/00
[52] U.S. Cl. .................................. 60/277; 60/276
[58] Field of Search .......................... 60/276, 277, 285; 73/40.5, 46, 49.7, 118.1

[56] References Cited

U.S. PATENT DOCUMENTS

| | | |
|---|---|---|
| 5,237,818 | 8/1993 | Ishii et al. |
| 5,419,183 | 5/1995 | Keys ..................... 73/40.5 R |
| 5,428,989 | 7/1995 | Jerde et al. ............ 73/40.5 R |
| 5,526,643 | 6/1996 | Mukaihira et al. .... 73/118.1 |
| 5,533,332 | 7/1996 | Uchikawa ............... 60/277 |

*Primary Examiner*—John T. Kwon
*Attorney, Agent, or Firm*—Evenson, McKeown, Edwards & Lenahan, P.L.L.C.

[57] ABSTRACT

The leak of exhaust system is detected by leak detection element, and when leak was detected, the diagnosis relating to air-fuel ratio feedback control or catalyst is stopped or corrected. A place and an amount of the leak are detected and as various control or diagnosis etc. are stopped or corrected according to the detected effect, over heat of the catalyst, incrementation of the harmful exhaust-gas and the false diagnosis of the catalyst can be prevented suitably.

18 Claims, 6 Drawing Sheets

EXHAUST CONTROL DEVICE OF INTERNAL COMBUSTION ENGINE

BACKGROUND OF THE INVENTION

This invention relates to an apparatus for measuring specification ingredients, i.e., oxygen density, in exhaust gas, and for adjusting air fuel ratio or diagnosing an exhaust gas cleaning apparatus such as a catalyst.

Particularly, the present invention relates to the exhaust gas control device for the internal combustion engine, which is suitable for detecting the exhaust gas leaked from an exhaust system, and for preventing an increase or misjudgement of harmful exhaust gas by the leak.

Oxygen density in exhaust gas is measured and the device for controlling air fuel ratio by feeding the measured exhaust gas back is widely known. In particular, by adjusting the air fuel ratio into a theoretically stoichiometric air fuel ratio and by providing a three way catalyst for the exhaust system, the exhaust gas cleaning apparatus which purifies HC, CO and NOx which are harmful exhaust gases, is generally used as an exhaust gas purification device for cars.

Furthermore, when the three way catalyst and the oxygen density sensor being parts composing the exhaust gas cleaning apparatus deteriorate or are broke down, the harmful exhaust gas is discharged into the atmosphere, and a diagnostic means for checking the deterioration and the trouble of these parts is widely used too. For example, the diagnostic means of the catalyst is disclosed in Japanese Patent Laid-open No. 4-292554 (1992) corresponding to U.S. Pat. No. 5,237,818.

In the devices stated above, a problem to solve in the case that the leak occurred in exhaust system is not considered. When a leak occurs in an exhaust system (for example, a hole opens in exhaust pipe, and the joining point of the parts is moderated), and load of the internal combustion engine is low and turning speed is low, a negative pressure occurs while the exhaust gas pressure is in pulsating. On account of this, air is drawn from the atmospheric air side into the exhaust system.

In this way, the influence in the case that the leak occurred is different according to a position where the leak generates. For example, when the leak occurs between oxygen density sensor for controlling the air fuel ratio and the catalyst, the air fuel ratio is controlled by feeding back so that the exhaust gas becomes theoretically stoichiometric air fuel ratio in a location of the oxygen density sensor, and the oxygen is excessively provided as the air is inhaled in the catalyst location. On account of this, NOx which is a harmful gas is not converted by catalyst, and is discharged into the atmosphere.

Furthermore, as disclosed in Japanese Patent Laid-open 4-292554(1992), when the oxygen density sensor is arranged downstream of the catalyst too and the catalyst is checked by an output signal of the oxygen density sensors positioned up and down stream of the catalyst, the oxygen density sensor down stream of the catalyst always becomes in lean state(oxygen excess), and it become impossible to check the catalyst, thereby a mis-judgement takes place.

When a leak occurres upstream of the oxygen density sensor for the air fuel ratio control, the fuel consumption generally increases because the feedback control is operated so as to obtain the theoretically stoichiometric air fuel ratio at oxygen density sensor location and to increase the fuel amount balancing with the oxygen inhaled by the leak in quantity.

As the Oxygen density sensor generates lean output corresponding to the negative pressure generated by exhaust-gas pressure pulsation. Furthermore, a fault occurs in diagnosing the oxygen sensor, the air-fuel ratio becomes more excessive than usual, so the harmful gas is discharged into the atmosphere as a result.

Furthermore, in the case that the leak is generated up stream of the catalyst, the exhaust-gas which isn't purified is discharged into the atmosphere when the exhaust-gas pressure is positive.

SUMMARY OF THE INVENTION

The object of the present invention is to provide an exhaust-gas control apparatus for an internal combustion engine, in which an increased discharge to atmosphere of harmful exhaust-gases by a leak and the false diagnoses of an exhaust emission control device such as the catalyst etc. may be suppressed.

In order to achieve the above object, a leak detection means for detecting a leak and a means for stopping or for correcting an air-fuel ratio feedback control or a diagnosis of exhaust emission control device such as catalyst when the leak is detected, are provided. Further, a means for warning an operator, and a means for memorizing a detected effect of the leak are provided.

According to the exhaust-gas control apparatus of the internal combustion engine in the present invention stated above, the diagnosis of the exhaust gas cleaning apparatus is stopped when the leak is detected, and false diagnosis of enhansed emissions is prevented. Also, feedback control of the air-fuel ratio by the oxygen density sensor is stopped. For example, an increase in the fuel consumption may be suppressed by performing the air-fuel ratio control without revising it with the feedback control. Frthermore, release of the harmful gas into atmosphere may be suppressed and the operator is warne promoting repairation of the faulting part..

DETAILED DESCRIPTION OF THE PREFERRED EMBODIMENTS

Figure 1:
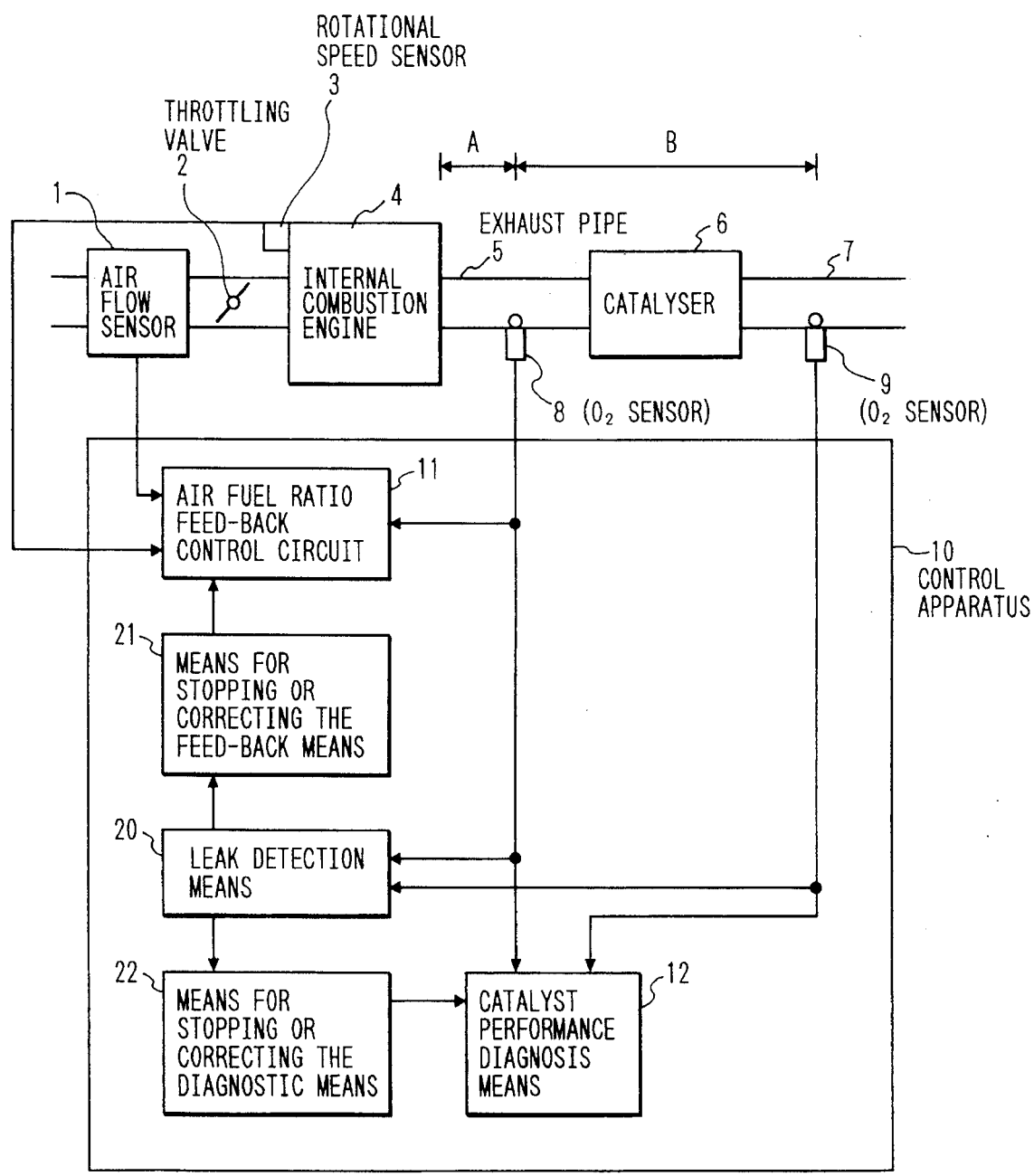
FIG. 1 is a drawing which shows a total construction of an embodiment in the present invention.

An embodiment of the present invention will be explained with use of the drawings as follows;

FIG. 1 shows a total construction of one embodiment in the present invention. Sucked air amount Qa to an internal combustion engine 4 is adjusted by a throttle valve 2 and is measured by an air flow sensor 1. And engine speed Ne of the internal combustion engine 4 is measured by a rotational speed sensor 3. The exhaust-gas passes through an exhaust pipe 5 and is reached to a catalyst 6, and is discharged through an exhaust pipe 7 into atmosphere. An oxygen density sensors 8, 9 are respectively arranged in the exhaust pipes 5 and 7. The outputs of various sensor are input into control apparatus 10.

The outputs of the air flow sensor 1, the rotational speed sensor 3 and the oxygen density sensor 8 are input into an air-fuel ratio feedback control means 11, and a fuel injection pulse duration Ti is calculated by the following equation, and a driving pulse is output into a fuel injector which is not illustrated based on this Ti, thereby, fuel is supplied.

$$Ti = K \times T_p \times \alpha + Tb$$

K: a coefficient (corrected by cooling water temperature and accelerate and decelerate)
Tp: Basic injection pulse duration
α: Feedback correction factor
Tb: Invalid injection pulse duration
Here, $$T_p = k \times Qa/Ne$$

K: A coefficient(by characteristic of fuel injector)

The feed back correction factor α is calculated so as to gradually increase when the oxygen density sensor 8 shows the air-fuel ratio to be lean, thereby amount of the fuel to the fuel injector is increased, and is calculated so as to gradually become small when the air-fuel ratio rich is shown, thereby small a quantity of fuel is fed to the injector.

The quantity of the fuel feed is revised according to the feeds back correction factor α which is usually in the region at a value of 1 or so.

The outputs of the oxygen density sensors 8 and 9 arranged at points up and down stream of the catalyst 6 are input into a catalyst performance diagnosis means 12, and a performance of the catalyst 6, namely a conversion efficiency, of the harmful gas is estimated, based on a mutual correlation function, of the wave forms output from both the oxygen density sensors. In the system stated above, the performance of catalyst 6 is estimated by utilizing a correlation function which exists between a performance of the catalyst and the mutual correlation function of the wave forms output from both the oxygen density sensors disposed up and down stream of the catalyst. When the catalysts performance estimated in this way become worse than a predetermined value, the operator receives an alarm for repairing of the catalyst. In this way, the condition of driving whilst large quantities of harmful gases are being released into the atomosphare is prevented.

In a leak detection means 20, the outputs of the oxygen density sensors 8 and 9 arranged up and down stream of the catalyst 6 are input, and the leak is detected from the outputs of the two oxygen density sensors.

When a leak is detected by the leak detection means 20, the control by the air-fuel ratio feedback control means 11 is stopped or revised by a stopping or correcting means (1) 21, and catalyst performance diagnosis by the catalyst performance diagnosis means 12 is stopped or revised by a stopping or correcting means (2) 22.

The leak detection method, and the stopping or correcting method of the air-fuel ratio feedback control and the catalyst performance diagnosis as mentioned above will now be explained in detail.

Firstly, the leak detection method;

As the detection method varies based on the position where the leak generates, the following explanations refer to cases where the leak firstly generates at a position A (the upper stream of the oxygen density sensor 8) and secondly at a position B(during the oxygen density sensors 8 and 9) in FIG. 1.

First when there is a leak in the position A, at a relatively a low speed and a low load, a negative pressure occurs in the exhaust pipe 5 by the exhaust pulsation synchronizing with every combustion, thereby air is inhaled and lean spike noises are supplied on the wave form of output from the oxygen density sensor 8.

Figure 2:
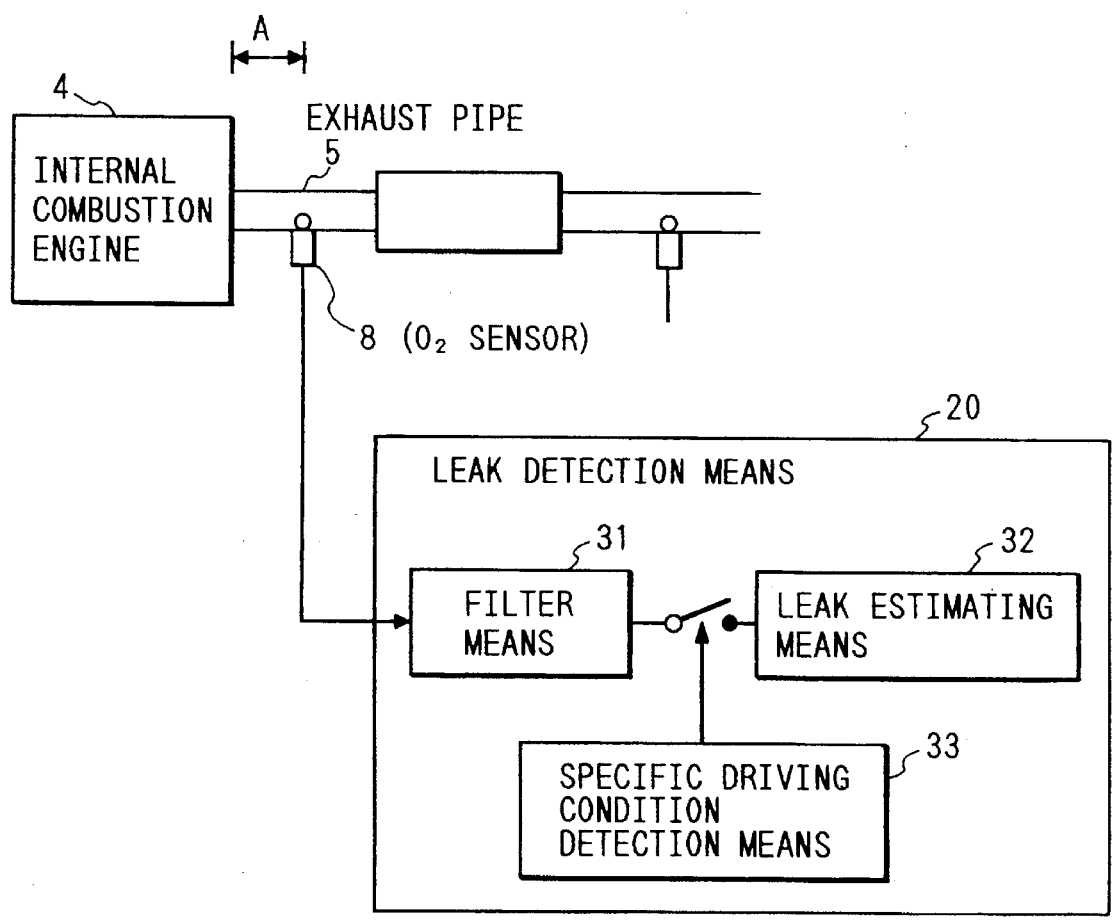
FIG. 2 is a drawing which shows an example of a leak detection means in the present invention.

Accordingly, as shown in FIG. 2, components synchronizing with the combustion are extracted by filtering the output wave form of the output from the oxygen density sensor 8 with a filter means 31, thereby the comparatively low speed and low load time is detected by a specific driving condition detection means 33. In the above driving condition, the leak is estimated by a leak estimating means 32 when the extracted component by filtering the output wave form is bigger than a predetermined value. Further, a quantity of the leak may be estimated by the extent of the extracted component.

Figure 3:
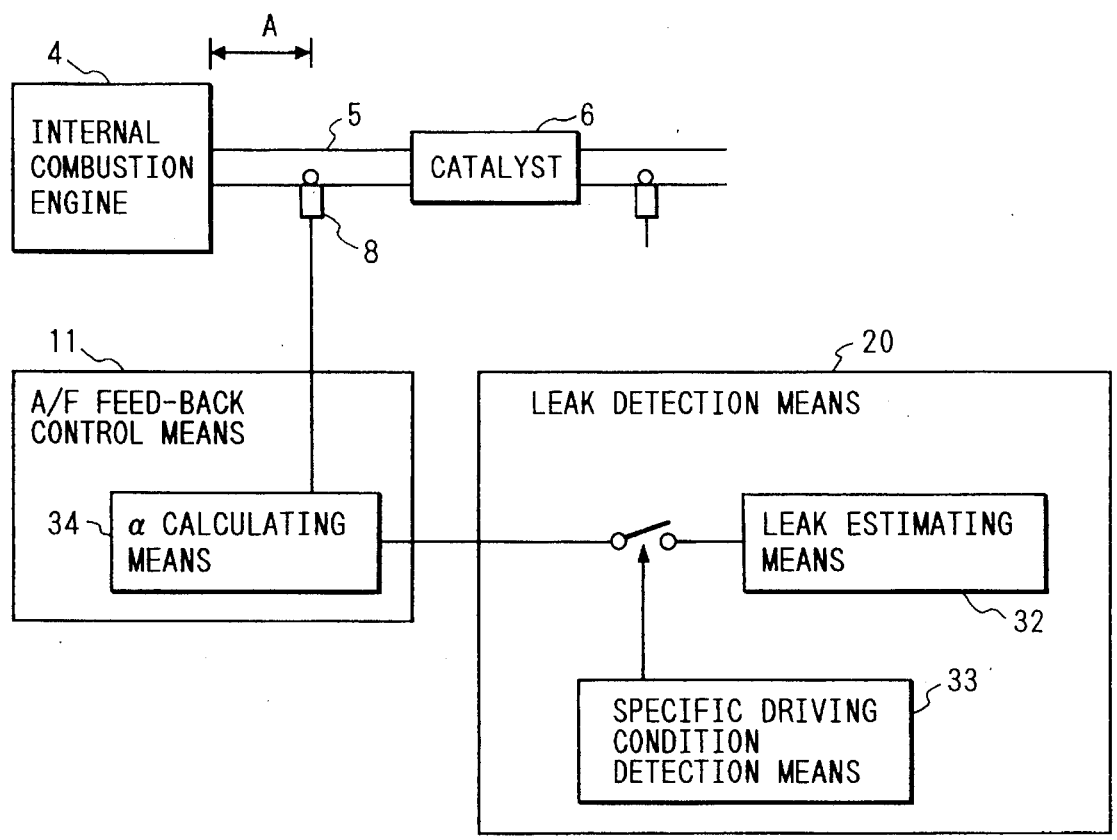
FIG. 3 is a drawing which shows a case of leak detection means in the present invention.

Furthermore, the leak may be detected by the feedback correction factor α calculated by air-fuel ratio feedback control means 11 as mentioned above. That is, when the leak arises, in the location of oxygen density sensor 8, the α which increases according to a quantity of the oxygen sucked by the leak as air-fuel ratio is controlled by a theoretically stoichiometric air fuel ratio. Accordingly as shown in FIG. 3, the leak is estimated when the value of α in the specific driving condition is larger than the predetermined value by taking taking account the effect of α account means in the same way as above. Further, a quantity of the leak may be estimated by the extent of the value of α.

In these examples, preferably, the factors other than the leak may be removed by comparing them with a value in a region that the negative pressure doesn't seem to arise in the exhaust pulsation.

Secondly, a leak arising in the position B is explained as follows;

In this case, the air-fuel ratio is controlled by a feedback control in order keep a theoretically stoichiometric air fuel ratio in a position of the oxygen density sensor 8. However, an condition of oxygen excess is provided in the position of the oxygen density sensor 9 in the same way as the case the leak arises in the position A when in the low speed and the low load because the air is sucked.

Figure 4:
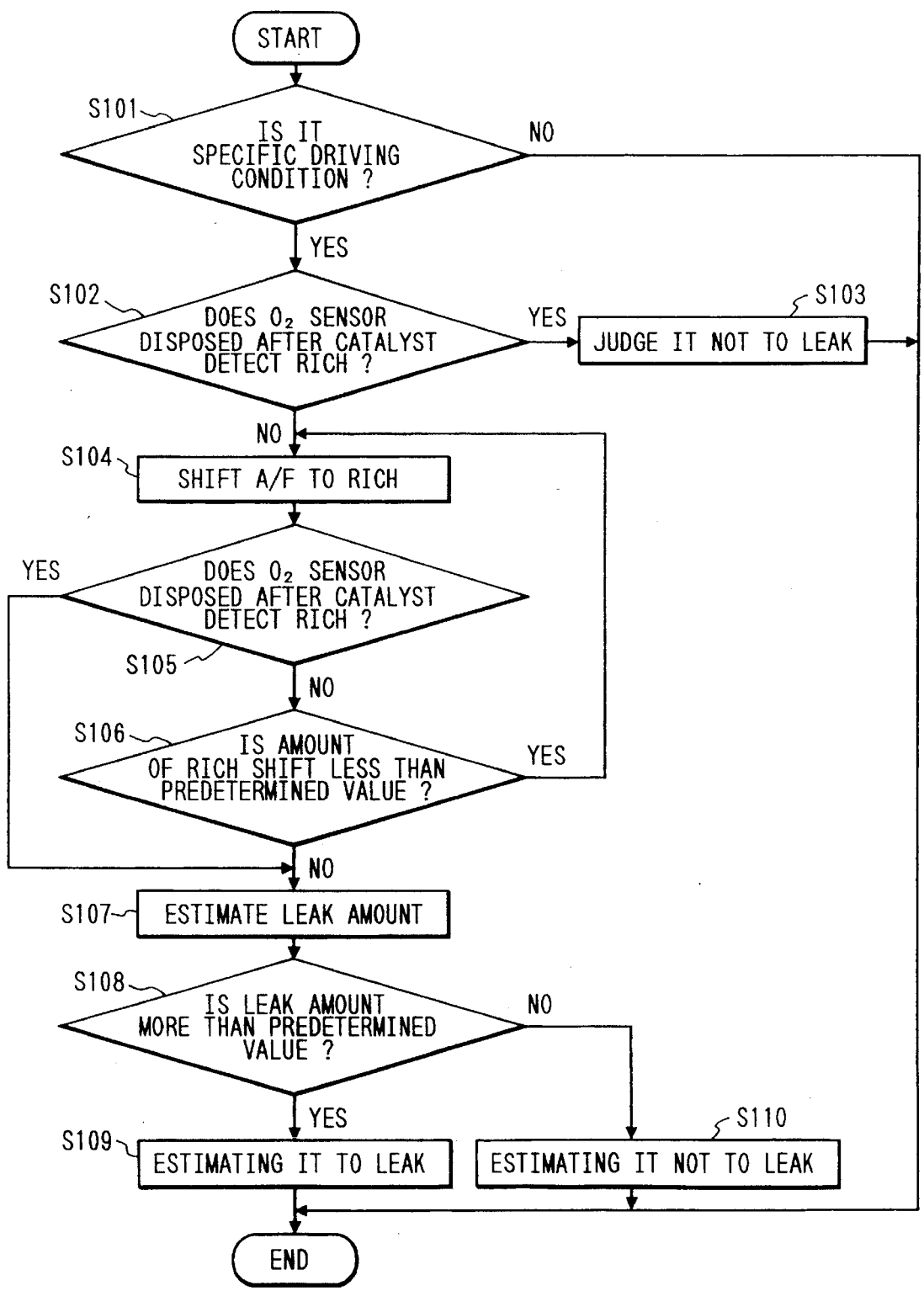
FIG. 4 is a drawing which shows example of a flow chart for detecting the leak in the present invention.

A flow chart for the leak detection is shown in FIG. 4. First of all, it is examined in step S101 whether the specific driving condition is performed. If it is No, the flow is finished and step S102 starts only in case of Yes, and the output of the oxygen density sensor 9 arranged down stream of the catalyst 6 is examined. When a state of the rich is shown, it progresses to step S103 and it judges to be no leak. When the rich is not shown, the extent of the rich is shifted till the oxygen density sensor 9 shows the rich gradually within a limit of a limiter, as shown in the flow from step S104 to step S106. The rich shift is performed by making the estimating voltage larger for estimating lean/rich mixture based on the output of the oxygen density sensor 8 when the air-fuel ratio feedback control is performed by the oxygen density sensor 8 for example. In step S107, a quantity of leak is estimated from a quantity of the rich shift when the oxygen density sensor 9 turned over into the rich. In the flowchart from step S108 to step S110, if a quantity of the estimated leak exceeds the predetermined value, it is judged as that the leak arises, and If the quantity does not exceed the predetermined value, it is judged as that the leak does not arise.

For example in the above case, if the air-fuel ratio up stream of the catalyst is shifted towards the rich side, the effect of the catalyst becomes small so that a considerable time may be needed till the effect of catalyst arises in the oxygen density sensor 9 at down stream of the catalyst. Accordingly, a predetermined should be needed before the effect is examined.

And, such the rich shift sometimes make the harmful component in exhaust-gas increased. Accordingly, the frequency of leak detection had better been limited so as to be within a predetermined times.

Another method is as follows;

Before the catalyst is activated, the output of the oxygen density sensors 8 and 9 may be compared each other. In this case, the frequency of leak detection decreases, but the effect of the catalyst is hard to detect, and there is an advantage that there is no need to shift to a rich mixture.

As stated above according to the present invention, it becomes possible to estimate the quantity and the position of the leak.

With regard to the air-fuel ratio feedback control detecting a leak in the next, the stopping and the correcting method of the catalyst performance diagnosis will be explained.

First, the leak arises at the position A in FIG. 1, as α becomes a big value, it has the effect of increasing the quantity of fuel and so the fuel consumption may be increased. Furthermore, as the fuel increased in quantity lacks of the oxygen, it does not burn in the combustion chamber of the internal combustion engine and burns in the exhaust pipe or the catalyst down stream of the leaks generating position. Thereby, the temperature of the catalyst rises too much and its performance may deteriorate.

About the stopping and correcting of the fuel ratio feedback control, if the leak is detected, the air-fuel ratio feedback control is stopped fundamentally, and it is preferable to fix the feedback correction factor α into 1.

But, in this case, because the exhaust-gas becomes the oxygen excess state in the catalyst 6, and the conversion efficiency of NOx falls and the amount thereof discharged by the atmospheric air is increased. Accordingly, it is preferable to generate an alarm to the operator simultaneously.

Figure 5:
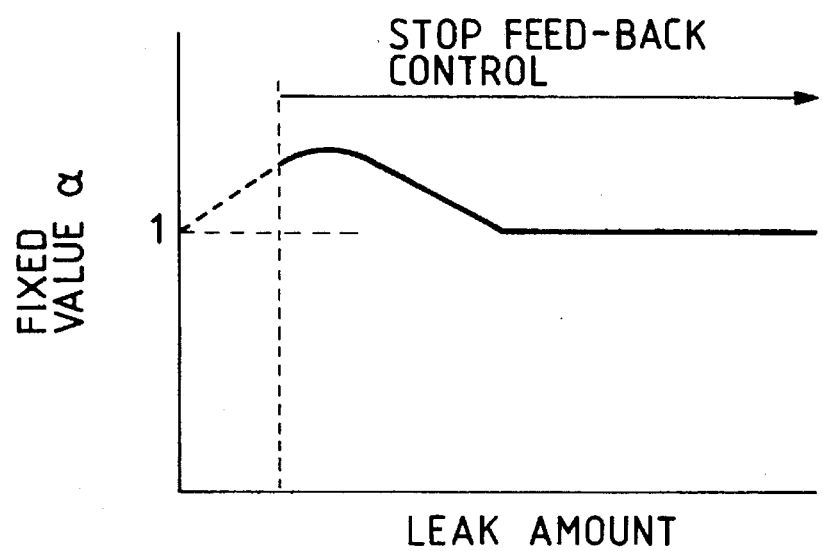
FIG. 5 is a drawing for showing a relationship of a fixed value of α with a quantity of the leak in the present invention.

Further when the estimated leak is relatively small, α is revised to be set a little larger to some extent than a fixed value as shown in FIG. 5, thereby the fuel is increased in quantity so that the temperature of the catalyst isn't promoted too much, and the conversion efficiency of NOx may be to be secured to some extent.

Further, without stopping the feedback control, the quantity of the fuel burning with the catalyst is reduced by shifting to the lean side, a temperature-rise of the catalyst may be held down. In the next, the stopping and correcting method of the performance diagnosis of the catalyst will be explained.

In a system for estimating the performance of the catalyst by the correlation function of the oxygen density sensor output at the up and down streams of the catalyst as stated above, the correlation function in which the quantity of leak is comparatively small becomes smaller than that in which there is no leak, because the catalyst temperature is high etc., that is, there is a tenency that the catalyst performance is judged so as to be in better side than an actual one. And when the amount of the leak becomes more than the predetermined value, a fluctuation width of the air-fuel ratio becomes bigger than as usual, and the correlation function becomes to have a little larger value on the contrary.

Figure 6:
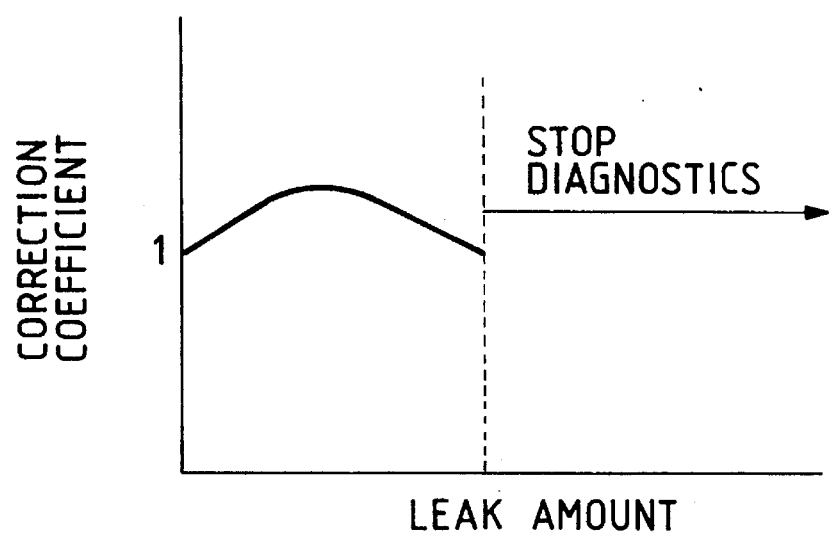
FIG. 6 is a drawing which shows a relationship of a quantity of the leak with a correction factor for catalyst diagnosis in the present invention.

Accordingly, for example, the performance diagnosing of the catalyst may be performed by multiplying the correlation function with the correction factor as shown in FIG. 6. Further, when a quantity of the leak exceeds a quantity of the predetermined value, the diagnosis is stopped because it becomes impossible to obtain an accuracy of the diagnosis to be secured.

In the next, relating to the stopping and correcting method of the oxygen density sensor diagnosing, when diagnosing a response speed from the output wave form for example, a responsibility is judged in a fast side (the side which is short in an answering time), because the lean spike is added on the output wave form.

Figure 7:
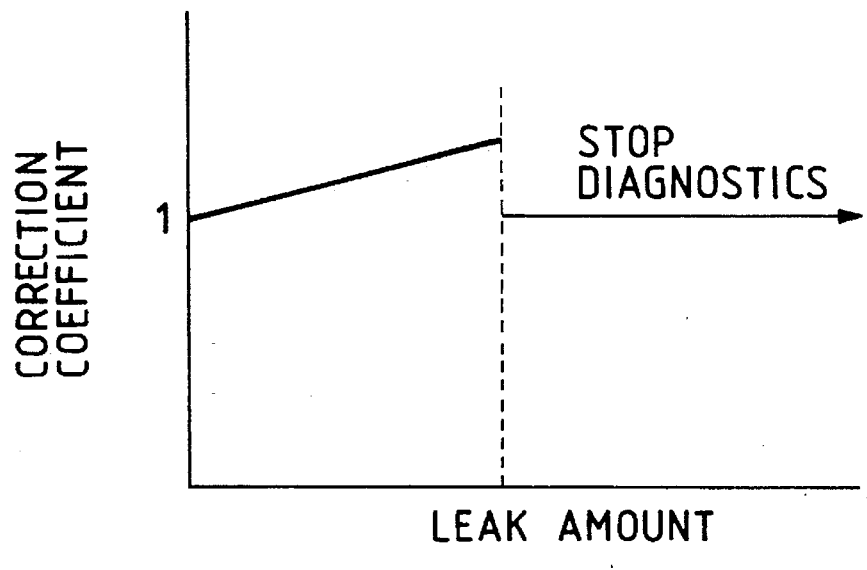
FIG. 7 is a drawing which shows a relationship of a quantity of leak with a correction factor for oxygen density sensor diagnosis in the present invention.

Accordingly, for example, as shown in FIG. 7, the responsibility diagnosis of the oxygen density sensor may be performed by multiplying the response time with the correction factor. And when the quantity of the leak exceeds the quantity of the predetermined value, the diagnosis is stopped because it becomes impossible to obtain an accuracy of the diagnosis to be secured.

Next, a case which the leak generates at the position B shown in FIG. 1 will be explained.

In this case that the leak arises at the upper stream of the catalyst in particular, Like the said article the feedback control is performed so as to obtain the theoretically stoichiometric air fuel ratio at the position of the oxygen density sensor 8, and the oxygen excess state is obtained at the position of the catalyst 6.

Therefore, NOx is not converted and is discharged into the atmospheric air. And as the oxygen density sensor 9 always becomes in the lean state, performance diagnosis of catalyst 6 becomes impossible and false diagnosing is performed.

Further, utilizing the signal of the oxygen density sensor 9, in the case that the feedback control is performed by feeding the air-fuel ratio back, increasing of the fuel consumption and overheat of the catalyst occur similarly as when there arise the leak at the position A.

Accordingly, relating to the air-fuel ratio feedback control (by the oxygen density sensor 8), for example in order to suppress the releasing of NOx to the atmosphere when the leak is detected, the air-fuel ratio feedback control is performed while shifting to the rich side, the air-fuel ratio feedback control is stopped or α is fixed in a little larger value than 1.

At all events, when the quantity of the leak exceeds the predetermined value, the conversion efficiency of NOx falls suddenly, and the amount discharged into the atmosphere increases rapidly, it is preferable to alarm to operator simultaneously.

Relating to the air-fuel ratio feedback control using the oxygen density sensor 9, the feedback control is stopped to prevent overheat of the catalyst.

Relating to the performance diagnosis of the catalyst, In a system for estimating the performance of the catalyst by the correlation function of the oxygen density sensor output at the up and down streams of the catalyst as stated above, the correlation function becomes very small because the output of the oxygen density sensor 9 disposed at the down stream of the catalyst always shows lean when the quantity of the leak is comparatively small, and the value of the correlation function becomes very small, thereby there arise a possibility that even deteriorated catalyst is judged not to be deteriorated. Accordingly, in the case the quantity of leak is small, the diagnosis of catalyst is controlled to be stopped.

Relating to the diagnosis of the oxygen density sensor 9, the diagnosis of catalyst is stopped because the output always shows the lean state.

The stopping and correcting methods mentioned above are explained as embodiments, and suitable methods are naturally different depending on each control methods and diagnosis methods. For example, when heat resistance of the catalyst is high, a way for suppressing aggravation of the exhaust-gas may be made much of to some extent by putting up the temperature.

Further, it is effected by driving condition of the internal combustion engine. For example, in a driving domain that the negative pressure doesn't appear in intake pulsations, as there is not needed particularly to apply the stopping and correcting methods, the drive domain for the diagnosis may be limited or changed to such region, for example.

Figure 8:
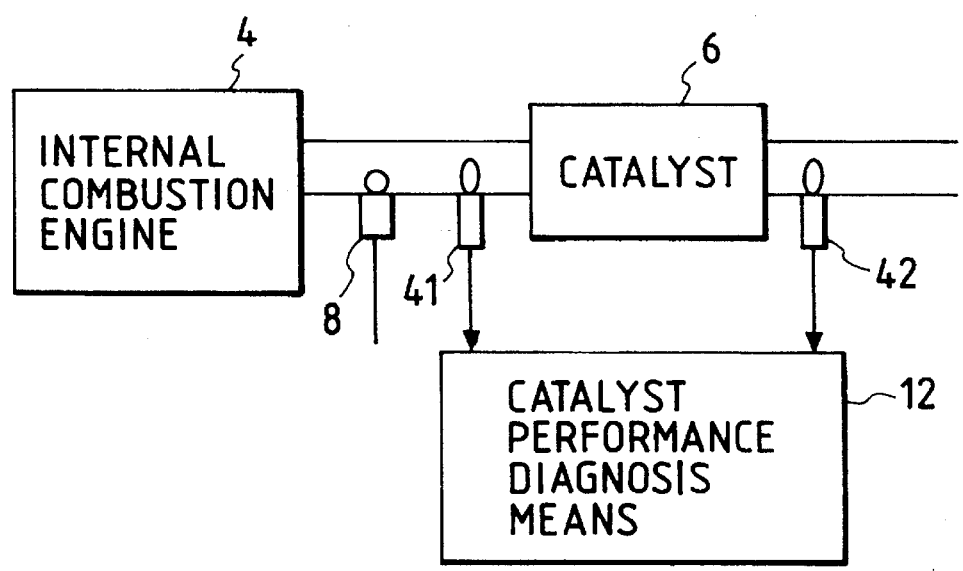
FIG. 8 is a drawing which shows other embodiment in the present invention.

Other embodiment will be shown in FIG. 8. The exhaust-gas temperature sensor 41 and 42 are arranged after and front of the catalyst 6, the performance of the catalyst 6 is diagnosed from a temperature difference detected by the catalyst the performance diagnosis means 12. In this case in the same way as stated above, the diagnosis method is stopped or corrected because there happens a case that the temperature of the catalyst abnormally rises by the leak. An exhaust control apparatus may be realized by utilizing a HC sensor for measuring HC density in place of the oxygen density sensor. The exhaust control apparatus may be realized by measuring the Nox density by utilizing a Nox sensor in place of the oxygen density sensor.

As mentioned above, according to the present invention, the air-fuel ratio feedback control and the diagnosis method of the oxygen density sensor or the catalyst are stopped or corrected based on a detected effect of the leak position and leak amount in the exhaust system.

Thereby, the deterioration by over heat of the catalyst, the aggravation of the exhaust-gas, and a false diagnosis of the exhaust purification system component may be suppressed. These stated above lead to preventing discharge to the atmosphere of the harmful gas entirely.

I claim:

1. An exhaust gas control apparatus of an internal combustion engine characterized by comprising a means for performing one of stopping or correcting a calculation of at least one specific component in exhaust-gas by using a signal input from an exhaust-gas sensor when a leak is detected by the signal of the exhaust gas sensor.

2. An exhaust gas control apparatus of an internal combustion engine as defined in claim 1, wherein said calculation of said at least one specific component in the exhaust-gas is performed in order to control by feeding back an air-fuel ratio.

3. An exhaust gas control apparatus of an internal combustion engine as defined in claim 1, wherein said calculation of said at least one specific component in the exhaust-gas is performed in order to diagnose an exhaust gas cleaning apparatus arranged in the exhaust system based on the output of the exhaust gas sensor.

4. An exhaust gas control apparatus of an internal combustion engine as defined in claim 1, wherein said calculation of said at least one specific component in the exhaust-gas is performed in order to control by feeding back an air-fuel ratio and in order to performed in order to diagnose an exhaust gas cleaning apparatus arranged in the exhaust system based on the output of the exhaust gas sensor.

5. An exhaust gas control apparatus of an internal combustion engine as defined in claim 1 wherein, the specific component is oxygen.

6. An exhaust gas control apparatus of an internal combustion engine characterized by comprising a means for stopping or correcting a feedback control for performing one of exhaust gas by an adjusting driving parameter relating to the exhaust-gas of the internal combustion engine when a leak is detected by using an exhaust gas sensor for detecting a condition of the exhaust-gas flown from an exhaust system and a leak detection means for detecting the leak.

7. An exhaust gas control apparatus of an internal combustion engine as defined in claim 6, wherein said exhaust gas sensor is used as a specific component detection for detecting oxygen component in the exhaust-gas.

8. An exhaust gas control apparatus of an internal combustion engine as defined in claim 7, wherein said exhaust-gas adjusting means is a feedback control means for feeding back the air-fuel ratio by adjusting an amount of a fuel supplied into the internal combustion engine based on an output of the specific component detection means.

9. An exhaust gas control apparatus of an internal combustion engine as defined in claim 6, wherein said exhaust-gas sensor is a temperature detection sensor for detecting temperature of the exhaust gas.

10. An exhaust gas control apparatus of an internal combustion engine as defined in claim 6, wherein said exhaust means diagnoses the exhaust gas sensor.

11. An exhaust gas control apparatus of an internal combustion engine as defined in claim 6, wherein said leak detecting means detects the leak based on output from a specific driving condition detection means for detecting a specific drive condition and the exhaust-gas sensor.

12. An exhaust gas control apparatus of an internal combustion engine as defined in claim 11, wherein said leak detection means detects the leak based on a frequency component about a combustion cycle of the output of the exhaust-gas sensor.

13. An exhaust gas control apparatus of an internal combustion engine as defined in claim 11, wherein said leak detection means detects the leak by comparing outputs of the exhaust-gas sensors arranged at up and down stream of the catalyst before the catalyst is activated.

14. An exhaust gas control apparatus having a leak detection means as defined in claim 11, wherein memorizing of the generation of the leak and/or warning to operator is performed when the leak is detected by the leak detection means.

15. An exhaust gas control apparatus of an internal combustion engine characterized by comprising a means for performing one of stopping or correcting an exhaust-gas component detection by an exhaust gas cleaning apparatus arranged in an exhaust system when a leak is detected by using an exhaust gas sensor for detecting a condition of the exhaust-gas flown from the exhaust system and a leak detection means for detecting the leak.

16. An exhaust gas control apparatus of an internal combustion engine as defined in claim 15, wherein said exhaust gas cleaning apparatus diagnosis means diagnoses the catalyst arranged in the exhaust system.

17. An exhaust gas control apparatus of an internal combustion engine characterized by comprising a means for performing one of stopping or correcting a feedback control for exhaust gas by an adjusting driving parameter relating to the exhaust-gas of the internal combustion engine and an exhaust-gas component detection by an exhaust gas cleaning apparatus arranged in an exhaust system when a leak is detected by using an exhaust gas sensor for detecting a condition of the exhaust-gas flown from the exhaust system and a leak detection means for detecting the leak.

18. A method for controlling exhaust gas of an internal combustion engine, comprising the steps of sensing a leak in an exhaust system of the engine, and performing one of stopping or correcting a calculation of at least one specific component in the exhaust gas by using a signal representative of the sensed leak.

* * * * *